(12) United States Patent
Kaeser et al.

(10) Patent No.: US 8,980,347 B2
(45) Date of Patent: Mar. 17, 2015

(54) METHOD FOR APPLYING A LIQUID SEAL RUBBER TO A CAPSULE

(75) Inventors: Thomas Kaeser, Brent (CH); Daniel Abegglen, Rances (CH); Alp Sarioglu, Etiler/Istanbul (TR); Alexandre Kollep, Lutry (CH); Marco Bacchi, Schattdorf (CH)

(73) Assignee: Nestec S.A., Vevey (CH)

( * ) Notice: Subject to any disclaimer, the term of this patent is extended or adjusted under 35 U.S.C. 154(b) by 830 days.

(21) Appl. No.: 13/054,675

(22) PCT Filed: Jul. 3, 2009

(86) PCT No.: PCT/EP2009/058411
§ 371 (c)(1),
(2), (4) Date: Apr. 15, 2011

(87) PCT Pub. No.: WO2010/006936
PCT Pub. Date: Jan. 21, 2010

(65) Prior Publication Data
US 2011/0259204 A1    Oct. 27, 2011

(30) Foreign Application Priority Data
Jul. 15, 2008    (EP) .................................. 08160410

(51) Int. Cl.
*A47J 31/00*    (2006.01)
*B05D 5/00*    (2006.01)
(Continued)

(52) U.S. Cl.
CPC . *B29C 70/80* (2013.01); *B05D 1/40* (2013.01); *B05D 3/0209* (2013.01);
(Continued)

(58) Field of Classification Search
CPC .......... B29C 70/80; F16J 15/14; F16J 15/108; B65D 85/8043; B05D 1/40; B05D 3/0209; B29L 2031/7174; B29L 2031/26

USPC ............ 427/385.5, 372.2, 387; 220/361, 364; 99/295; 426/77
See application file for complete search history.

(56) References Cited

U.S. PATENT DOCUMENTS 5,376,416 A  * 12/1994  Nussen et al. ................ 428/35.7
5,402,707 A     4/1995   Fond et al.
2006/0110507 A1* 5/2006  Yoakim et al. ................ 426/433
2007/0082151 A1 4/2007   Hatano et al.

FOREIGN PATENT DOCUMENTS

CN    1487804    4/2004
CN    1878704    12/2006
(Continued)

OTHER PUBLICATIONS

International Search Report—PCT/EP2009/058411—mailed Sep. 22, 2009—4 pages.

*Primary Examiner* — Jianying Atkisson
(74) *Attorney, Agent, or Firm* — K&L Gates LLP

(57) ABSTRACT

The present invention proposes a method for providing a rubber-elastic sealing member onto a capsule (1) intended for producing a beverage in a beverage production device, wherein the capsule has a body portion (3) having a side wall (3a) and a flange-like rim portion (2), wherein the rim portion (2) extends from the side wall (3a) of the body portion (3), the method comprising the steps of: —applying an uncured sealing composition (4) in a liquid or viscous state onto the rim portion (2) of the capsule (1), —heating said applied sealing composition (4) such that the sealing composition at least partially migrates towards the side wall (3a) until it reaches the side wall, and—curing the sealing composition (4) after the migration towards the side wall (3a).

12 Claims, 6 Drawing Sheets

(51) Int. Cl.
  *B29C 70/80* (2006.01)
  *B65D 85/804* (2006.01)
  *F16J 15/10* (2006.01)
  *F16J 15/14* (2006.01)
  *B05D 1/40* (2006.01)
  *B05D 3/02* (2006.01)
  *B29L 31/26* (2006.01)
  *B29L 31/00* (2006.01)

(52) U.S. Cl.
  CPC ..... *B29L 2031/26* (2013.01); *B29L 2031/7174* (2013.01); *B65D 85/8043* (2013.01); *F16J 15/108* (2013.01); *F16J 15/14* (2013.01)
  USPC .......... 426/77; 427/372.2; 427/385.5; 99/295

(56) References Cited

FOREIGN PATENT DOCUMENTS

| | | |
|---|---|---|
| CN | 1980589 | 6/2007 |
| EP | 512470 | 11/1992 |
| EP | 1577080 | 9/2005 |
| EP | 1654966 | 5/2006 |
| EP | 1702543 | 9/2006 |
| FR | 2213757 | 8/1974 |
| GB | 1130774 | 10/1968 |
| JP | 2008-517639 | 5/2008 |
| WO | WO2005042373 | 5/2005 |
| WO | 2006/045515 | 5/2006 |
| WO | 2007122208 | 11/2007 |

\* cited by examiner

— PRIOR ART —

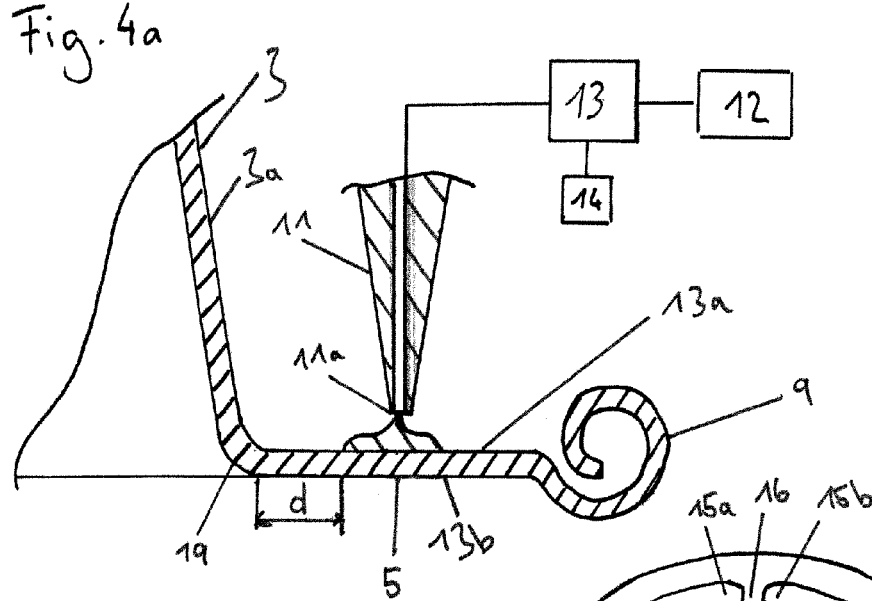
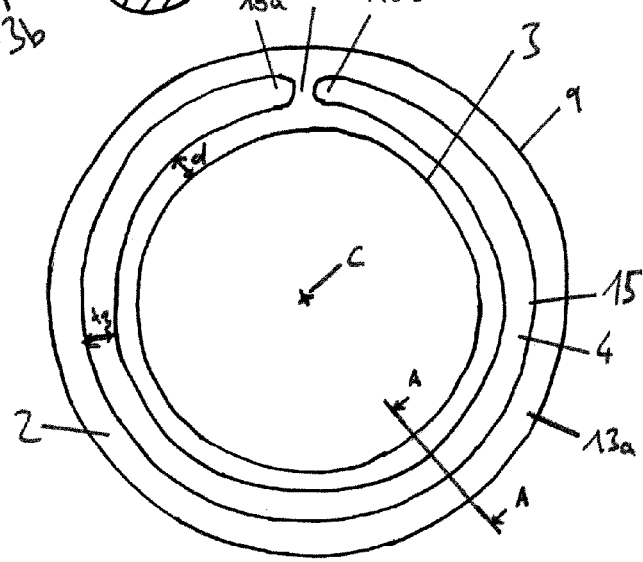
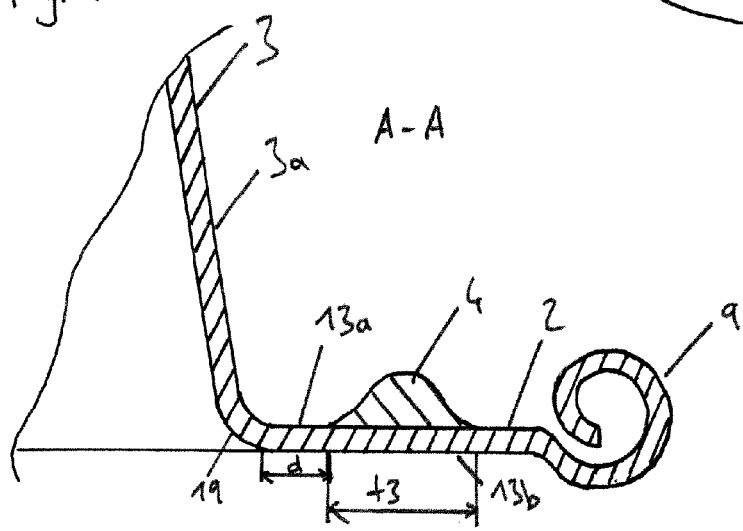

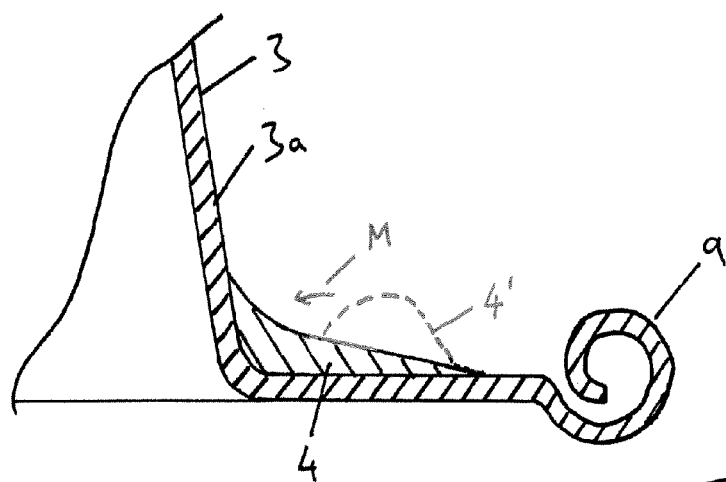
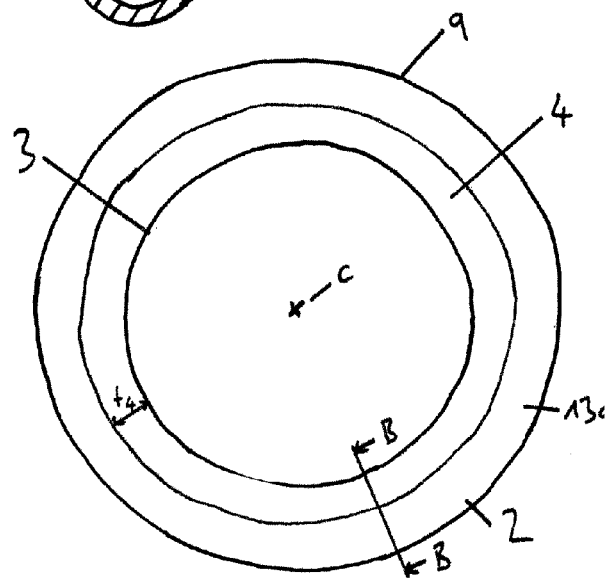
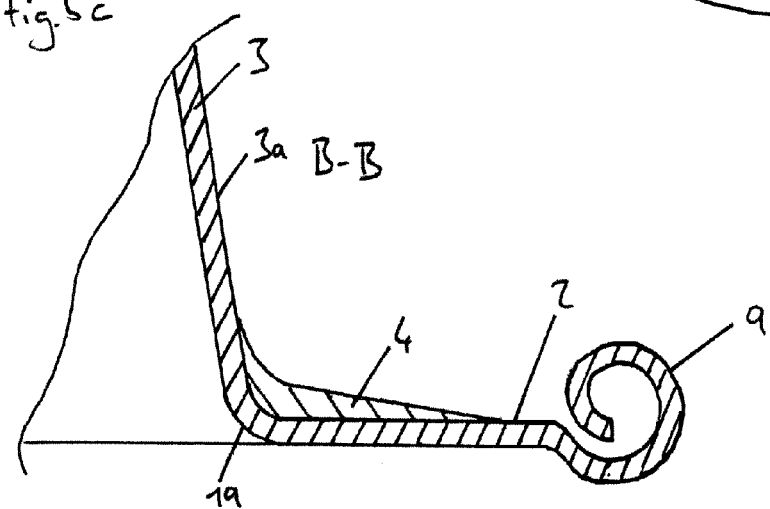

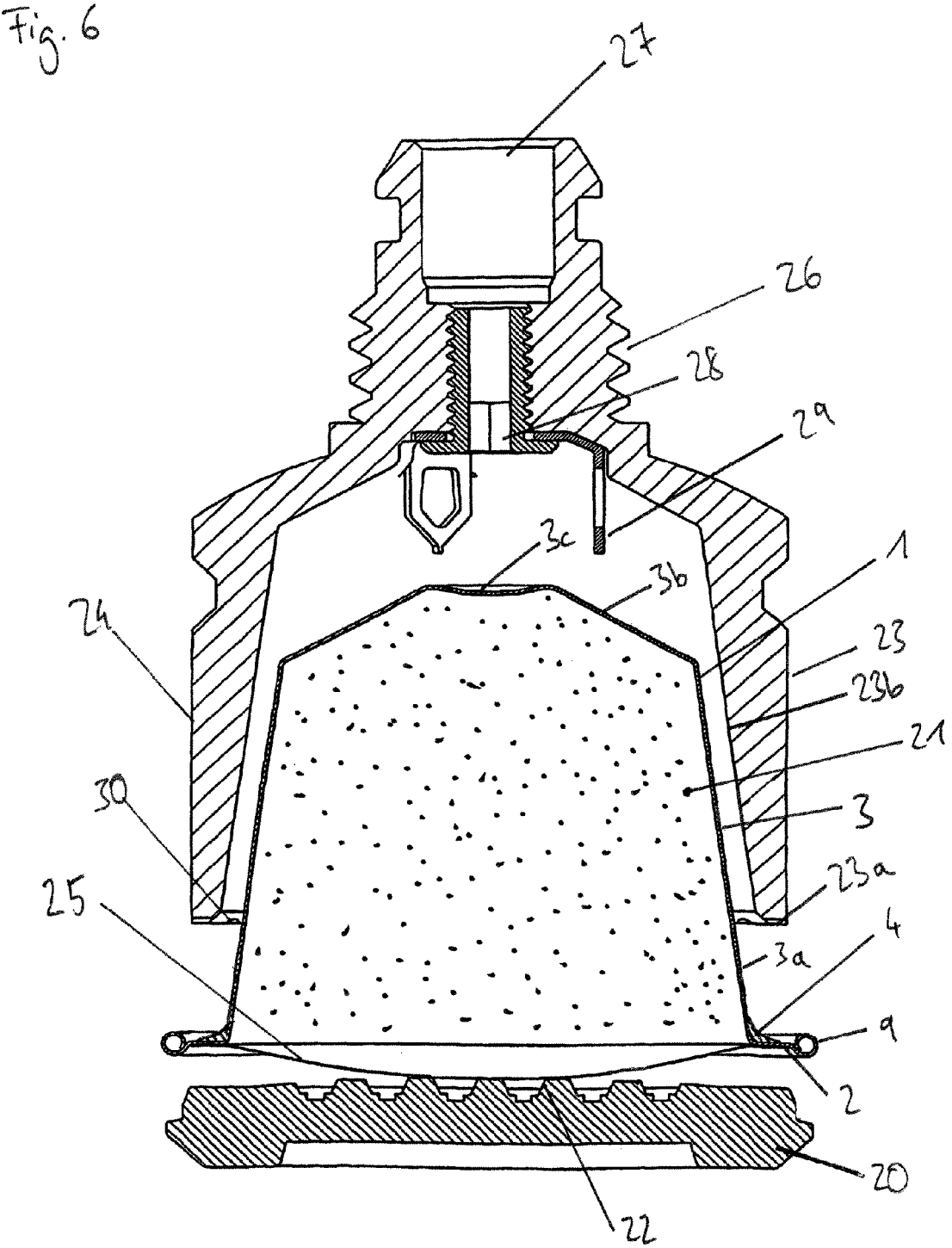

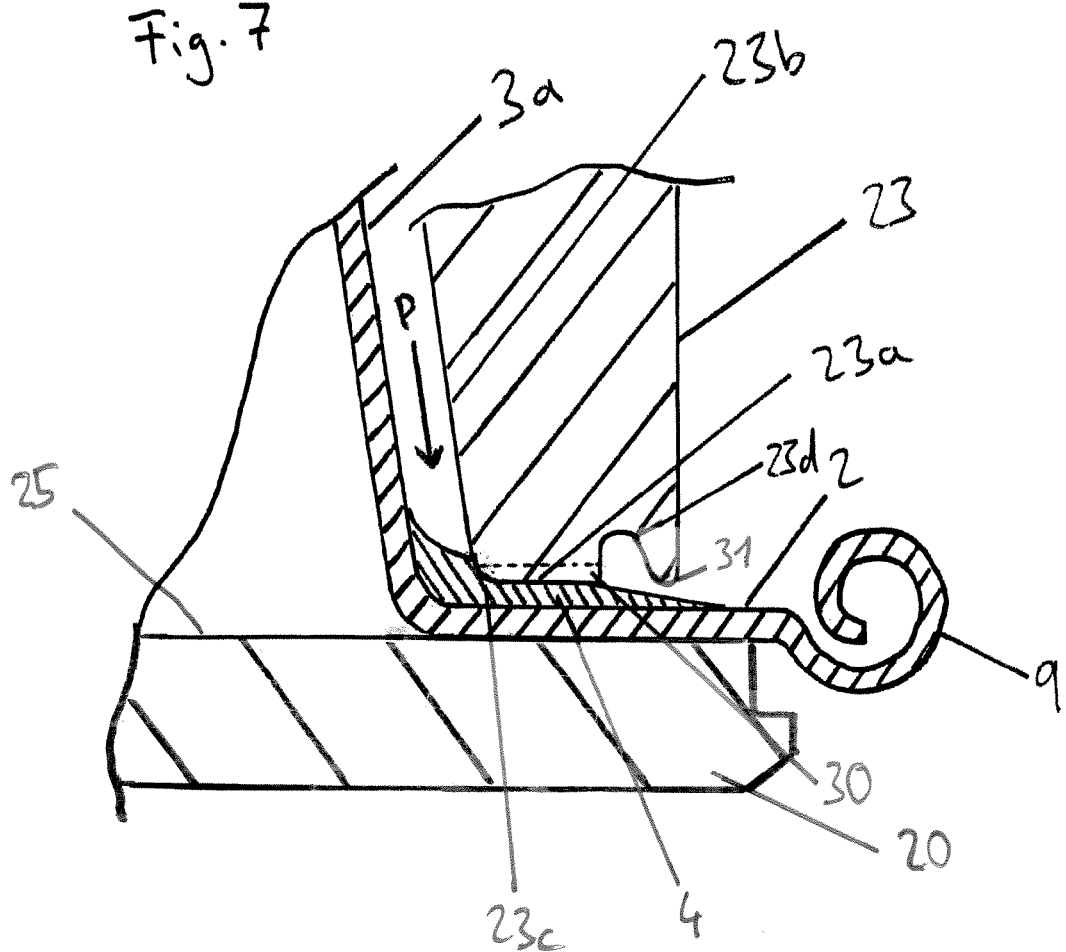

METHOD FOR APPLYING A LIQUID SEAL RUBBER TO A CAPSULE

FIELD OF THE INVENTION

The present invention generally relates to the field of sealed capsules containing portioned beverage ingredients. More particularly, the invention relates to a method of applying a sealing composition to such a capsule to enable a water-tight interaction with dedicated enclosing means of a beverage production device designed to prepare a liquid comestible on the basis of the ingredients contained within the capsule.

BACKGROUND OF THE INVENTION

Devices for preparing a beverage by injecting pressurized fluid into a capsule are well-known, especially in the field of producing coffee or coffee type beverages. In addition, other comestible ingredients such as chocolate or milk products can be contained within the capsule. By means of an interaction of these ingredients with a liquid, a beverage or other comestibles, such as for example soup, can be produced. The interaction can be for example an extraction, brewing, dissolution, etc. process. Such a capsule is particularly adapted to contain ground coffee in order to produce a coffee beverage by having hot water under pressure enter the capsule and draining a coffee beverage from the capsule.

The advantages of such a system are in particular the conservation and freshness of the ingredients, as well as the possibility of facilitating the operations of preparing the beverage.

Systems and methods for obtaining fluid comestibles from substances containing capsules are for example known from EP-A-512470 (counterpart of U.S. Pat. No. 5,402,707).

The capsule 101 as shown in FIG. 1 has a frustoconically-shaped cup 102 which may be filled e.g. with roasted and ground coffee 103 and which is closed by a foil-like tear face cover 104 welded and/or crimped to a flange-like rim which extends laterally from the side-wall of cup 102. A capsule holder 111 comprises a flow grill 112 with relief surface element members 113.

The capsule holder 111 is accommodated in its support 115 which has a lateral wall 124 and a bore 127 for the passage of extracted coffee beverage.

As can be seen from FIG. 1, the extraction system further comprises a water injector 107 having a water inlet channel 120 and an annular element 108 with an internal recess of which the shape substantially corresponds to the outer shape of the capsule. On its outer part, the annular member 108 comprises a spring 122 holding a ring 123 for releasing the capsule on completion of extraction.

In operation, a capsule 101 is placed in the capsule holder 111. The water injector 107 perforates the upper face of the cup 102. The lower tear face 104 of the capsule rests on the radially arranged members 113 of the capsule holder 111.

The water is injected through the channel 120 of the water injector 107 and impinges on the bed 103 of coffee. The pressure in the capsule 101 increases and the tear face 104 increasingly follows the shape of the radial opening relief members 113. Such radial opening relief members could be replaced by pyramid-shaped relief members or other shapes of relief. When the constituent material of the tear face reaches its breaking stress, the tear face tears along the relief members. The extracted coffee flows through the orifices of the flow grill 112 and is recovered in a container (not shown) beneath the bore 127.

The principles of this extraction process as far as it can be maintained in connection with the present invention can be summarized as follows:

An initially sealed capsule is inserted in capsule holder means;

The capsule holder means is then introduced associated to the water injection means of the machine such that an annular element (108 in FIG. 1) surrounds the sealed capsule.

In a first wall of the capsule at least one opening is generated.

Water entering the capsule through the opening in the first wall is interacting with the ingredients contained in the capsule while traversing the interior of the capsule and is then made to leave the capsule through at least one opening/perforation created in the second wall.

Thereby, the ingredients in the capsule constitute the 'bottleneck' of the flow path of the water and will therefore cause a pressure drop between the upstream and the downstream side of the liquid flow through the capsule, which pressure drop will even increase during the interaction between the liquid and the ingredients for example due to a swelling of the ingredients. Correspondingly it has to be assured that the only water flow is actually taking place through the interior of the capsule (arrow A1) and that no water can flow from the water injector into the interstice between the annular enclosing member 108 and the exterior of the capsule 101 and then to the draining bore 127 of the device.

The arrow A2 illustrates this undesired water flow path. In other words, any water flow exterior to the capsule 101 has to be stopped by a sealing engagement being positioned in the interstice between the annular member 108 and the capsule 101 (or the annular member and the capsule holder) and in the flow path between the water injector and the beverage-draining bore. In the embodiment as shown in FIG. 1 such sealing engagement can be achieved at least to a certain degree by the pinching engagement between the annular member 108, the flange-like rim of the side wall of the capsule 101 and the capsule holder.

In case the sealing engagement is not working properly and water is flowing outside the capsule, no pressure sufficient to cause the tearing of the tear face will be built up inside the capsule or, alternatively, the pressure will be causing no complete tearing of the tear face and therefore a poor extraction of the substance. In such a scenario water will be drained from the beverage production device without having interacted or fully interacted under sufficient pressure conditions, with the ingredients contained in the capsule.

An improvement could be thought of according to which this sealing engagement is further improved by lining the inner wall of the annular member with a rubber-elastic material. With other words, according to said approach the sealing engagement is assured by structures fixed to or attached with the beverage-producing device. This has disadvantages in that after the use of a substantial number of capsules a wearing off of the fixed sealing means can take place such that the quality of the produced beverage is increasingly deteriorated by water passing the no longer properly efficient sealing.

Any 'leak' at the exterior of the capsule reduces the pressure build-up inside the capsule. If the pressure is insufficient, the tear membrane may not open or may open only partly. On the other hand, it is well known that a sufficient extraction pressure is a key factor for the quality of espresso-style coffee.

The present invention correspondingly aims at an improvement of the sealing engagement positioned between the liquid inlet and the beverage draining side of such a beverage production system.

It is thereby the central idea of the present invention to transfer a resilient part of the sealing engagement from the beverage production device to the capsule. The advantage is that any resilient sealing member is only used once (i.e. only with the associated capsule) such that a proper functioning of the sealing can be assured and less hygienic, cleaning and/or scale-deposition problems can occur at the sealing member.

The present invention thus especially aims at an improvement of the capsules, such that state-of-the-art beverage production devices with built-in sealing means as for example shown in EP-A-512470 can also be used in connection with a capsule according to the present invention.

EP 1 654 966 B1 relates to a capsule being configured for insertion in a beverage production device in order to make a liquid under pressure enter the capsule and to interact with the ingredients in the capsule. Thereby, the capsule comprises a resilient sealing member in the form of an O-ring or a ring having an L-shaped cross-section which is attached to the body of the capsule by means of an adhesive or by welding for example.

One possible mode to apply such a sealing means to the capsule would be by injection moulding, but this process suffers the disadvantage that it requires moulds for each body of the capsule and very high precision in the injection and tooling. Therefore, a cheaper, more convenient way is to apply the sealing means by deposition of liquid rubber on the capsule and curing the rubber on the body of the capsule.

It should be noted that the position of the sealing means as well as its distribution on the capsule is of importance to obtain efficient sealing of the capsule. It is therefore an object of the present invention to further enhance the efficiency of the sealing means provided to the capsule and in particular, to improve the positioning process of the sealing means at the capsule.

Thereby, the seal has to be accurately placed at the intersection of the rim and the side wall of the body of the capsule in order to form an L-shaped sealing portion having a concave outer surface.

Moreover, a process is sought-after which only requires a small amount of liquid rubber while maintaining an efficient sealing of the capsule. A small, discrete amount of liquid rubber enables to reduce the closing force of the beverage producing device about the capsule and it also saves important manufacturing costs.

The object is achieved by means of the features of the independent claims. The depending claims develop further the central idea of the present invention.

OBJECT AND SUMMARY OF THE INVENTION

The present invention proposes a method for providing a rubber-elastic sealing member onto a capsule, wherein the capsule has a cylindrical or frusto-conical body portion having a side wall and a flange like rim portion, wherein the rim portion extends from the side wall of the body portion, the method comprising the steps of:
applying an uncured sealing composition in a liquid or viscous state onto the rim portion of the capsule,
heating said applied sealing composition such that the sealing composition at least partially migrates towards the side wall until it reaches the side wall, and
curing the sealing composition after the migration towards the side wall.

According to the method, a sealing composition can be accurately and conveniently placed at the intersection of the side wall and the flange-like rim portion of the body of the capsule such that a water-tight sealing is obtained at said intersection.

In general, the application of the sealing composition is carried out in a facility remote from the filling lines for food safety respectively hygiene and logistic reasons. Hence, the sealing composition is preferably applied after a production process of the capsule bodies. In a second step, the capsule bodies are stacked and send to the filling and sealing factory where the body of the capsule is filled with the corresponding ingredients and sealing of the capsule by means of a dedicated membrane is carried out afterwards.

In a preferred embodiment, the positioning of the uncured sealing composition onto the rim portion of the capsule is carried out by a needle or nozzle member being connected to a supply for the sealing composition. Preferably a multitude of capsules which are to be provided with the sealing composition are placed on a moving tray which can be horizontally displaced.

Thereby, the described heating of the uncured sealing composition which takes place before the curing of the sealing composition leads to the migration of said sealing composition from the rim portion to the side wall of the capsule due to attractive forces such as electrostatic forces and surface tension between the sealing composition and the side of the body of the capsule.

In a preferred embodiment, the capsule is made of metal such as aluminium and formed by a deep drawing operation. Hence, the body of the capsule may be covered with a lacquer and a residue of lubricant necessary during deep drawing of the body which may promote the attraction of the sealing composition to the body of the capsule. Accordingly, said heating of the sealing composition before the curing process enables a desired equal distribution of the uncured sealing composition at the intersection between the rim portion and the body portion of the capsule.

Please note that the deposition of the sealing composition is preferably done on the body of the capsule after its forming but before its filling with the coffee and its sealing at the rim portion, e.g. by means of a membrane provided to the rim portion.

The sealing composition is preferably a resilient, rubber-elastic material which is selected from elastomers, silicones, plastics, latex, balata or others. The sealing composition is preferably transparent.

Preferably, a silicone rubber marketed as 'Addisil 1540d" commercialised by General Electric Company is used as liquid silicone rubber for the sealing composition.

In a preferred embodiment, the sealing composition is applied in a non-continuous fashion. This means, that preferably a cord of sealing composition is dispensed onto the flange like rim portion such that a gap is formed between the dispensing start and end point. Hence, the flowing of the uncured sealing composition before the curing step is anticipated. Therefore, a surcharge of sealing material is avoided locally at the junction line between the start and end point.

In a preferred embodiment, the application of the sealing composition is preferably carried out in a pulsed fashion. In particular, pulsing may be carried out at the beginning of the dispensing of the liquid sealing composition to the rim portion of the capsule. Hence, the so-called 'snake-head' overdosing by which a larger drop of material is deposited at the tip of the needle at the beginning of the dispensing due to accumulation of material between the dispensing steps can be effectively prevented. Accordingly, the delivery of the cord of sealing composition ramps up more smoothly within the dispensing member and creates a more accurate thickness of the cord on the application area.

The sealing composition is preferably applied onto the rim portion of the capsule at a predefined distance from the intersection of the rim portion and the side wall of the capsule. Hence, a predefined distance of the applied sealing composition to the side wall of the capsule is maintained such that the sealing composition can migrate towards the side wall of the capsule during a heating process. Thereby, the distance from the body portion of the capsule is preferably chosen such that the sealing composition is applied onto a central portion of the rim portion.

The sealing composition is applied circumferentially to the rim portion and thus, the distance of the applied cord of sealing composition to the side wall of the capsule is preferably equal at each side of the capsule, i.e. the cord of sealing composition is preferably concentrically arranged to the centric axis of the capsule body.

The amount of sealing material dispensed onto the rim portion of the capsule is preferably between 10 and 150 mg and more preferably between 40 and 80 mg, most preferably of about 53 (+/−3) mg. Hence, an effective sealing means can be formed at the capsule with a very little amount of sealing material. Due to the very little amount involved, the seal is almost invisible to naked eyes, however, it is sufficient to create a water tight-seal at closing in the beverage preparation device. Its impact on environment is so limited and its added cost to the capsule is minimum.

The hardness of the applied sealing material in its cured state is preferably between 20 and 40 Shore A.

The time for dispensing a cord of sealing component onto the rim portion of the capsule is preferably less than one second and more preferably between 400 and 900 ms.

The migration of the sealing composition towards the side wall of the capsule is preferably obtained by heating of the sealing composition at an oven temperature of 60 to 80° C. for 1 to 4 minutes.

The migration of the sealing composition towards the body of the capsule preferably forms a continuous sealing portion present on both the rim portion and on a portion of the body of the capsule. Thereby, no gaps are present within said continuous sealing portion. This means that the end of the cord dispensed onto the rim portion, i.e. the dispensing start and end point, are joined after said migration. Hence, said sealing portion is preferably equally distributed about the circumferential intersection between the rim and the body portion of the capsule. According to this, an accurate positioning and a unitary thickness of the sealing composition are obtained.

Moreover, after heating and thus, after the migration of the sealing composition, said continuous sealing portion preferably comprises a concave L-shaped cross-section when seen in a cross-sectional side view. According to this embodiment, an effective sealing of the capsule is obtainable with a minimum amount of sealing material.

Curing of the sealing composition is preferably carried out at a temperature of 110 to 160° C. for 4 to 10 minutes. Accordingly, after the curing process, a stable and resilient sealing means is formed at the capsule.

The heating and curing steps according to the present invention are preferably carried out in an oven wherein the capsules are moved supported by a tray. Thereby, the oven is preferably equipped with a plurality of different heating chambers which are set at the desired temperatures. The oven has preferably four chambers, one of which is set between 60 to 80° C., and 3 others which are set between 110 to 160° C. Preferably, the three curing chambers differ in their temperature such that the curing process can be slightly adjusted. The temperature during curing should not exceed 160° C., since this would lead to a damage of the sealing member or other components of the capsule.

In a second aspect, the invention proposes a capsule for containing beverage ingredients which is designed for insertion in a beverage production device in which a liquid under pressure enters the capsule in order to interact with the ingredients in the capsule and to drain a beverage from the capsule, wherein the capsule comprises a body, a flange-like rim and a resilient sealing member formed on an outer surface of the capsule, characterised in that said sealing member forms a continuous portion which is equally distributed about the circumferential intersection between the rim and the body of the capsule.

Thereby, the sealing member is preferably applied to the body of the capsule by means of the method as outlined above.

In a preferred embodiment, the outer surface of the cured sealing means is linear or meniscus-like when seen in a cross-sectional view.

The sealing means preferably has a maximum thickness, when measured in an angle of 45° from the transition from the rim portion to the side wall of the base body, of between 0.3 and 0.7 mm, and more preferably between 0.4 and 0.6 mm. According to this embodiment, the interaction between the sealing means and a dedicated enclosing member of a beverage production device to which the capsule may be provided is enhanced such that effective sealing of the capsule is obtained during the beverage production process.

In a preferred embodiment, the thickness of the sealing means continuously decreases towards the end at the side wall of the base body portion and the end at the rim portion, respectively. Hence, effective sealing means may be provided to the capsule by a minimum amount of applied sealing material. According to this, a very cost-efficient embodiment of the sealing means can be obtained.

Please note that in order to obtain an efficient and water-tight sealing at the body of the capsule, a very regular and precise application of the sealing composition at the intersection between a rim portion and the body of the capsule is necessary, which is achieved by means of the method according to the present invention. However, another familiar process may be applied for obtaining the described advantages. For example, the cord of liquid or viscous sealing composition may be applied to the side wall of the body of the capsule and then be made to migrate towards the rim portion by a heating process in order to displace the sealing means at the intersection of the body and the rim portion.

The described production system enables an effective interaction between a capsule according to the present invention and a dedicated beverage production device which is designed to provide a heated and pressurized liquid to the interior of the capsule. According to the invention, a beverage can be prepared by the described production system without any leakage of the capsule.

BRIEF DESCRIPTION OF THE DRAWINGS

Further features, advantages and objects of the present invention will become apparent for the skilled person when reading the following detailed description of embodiments of the present invention, when taken in conjunction with the figures of the enclosed drawings.

FIG. 4a to 4c show the application of the sealing composition onto the rim portion of the capsule's body.

FIG. 5a to 5c show the applied sealing composition after the heating step and the curing step.

FIG. 6 shows a preferred embodiment of the beverage production device comprising an enclosing member suitable for enclosing a capsule according to the present invention in order to enable a beverage preparation.

FIG. 7 shows the interaction of the sealing composition applied to the intersection between the rim portion and the body portion of the capsule and a dedicated enclosing member of a beverage production machine.

DETAILED DESCRIPTION OF EMBODIMENTS

Figure 1:
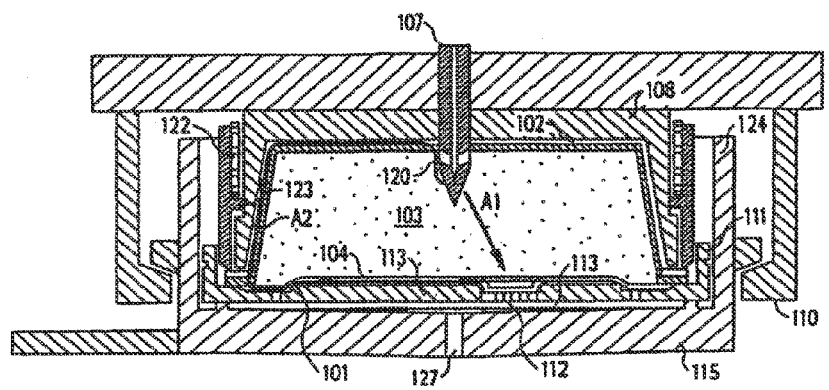
FIG. 1 shows an extraction capsule known from prior art document EP-A-512 470.
Figure 2:
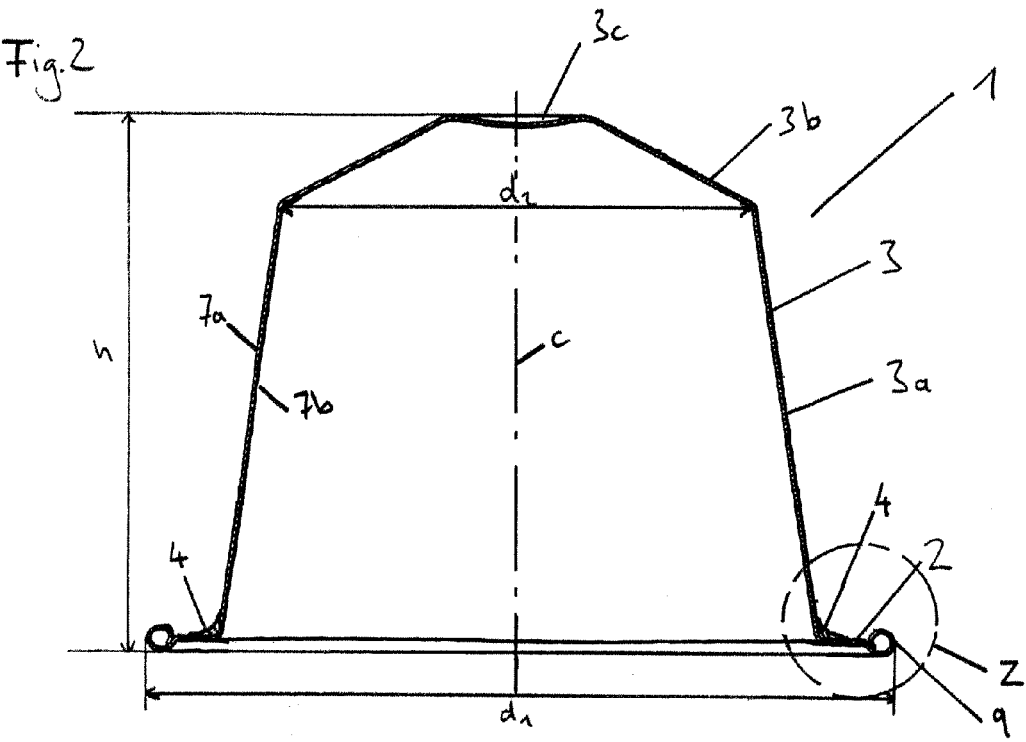
FIG. 2 shows a body of the capsule according to the present invention in sectional side view.

FIG. 2 shows a preferred embodiment of a capsule according to the present invention in sectional side view. The capsule 1 comprises a frusto-conical body portion 3 having a side wall 3a and a substantially transversal closed base portion 3b. Said base portion 3b comprises a central recess 3c. At the other end of the frusto-conical body portion 3, a flange-like rim portion 2 is connected to the side wall 3a of the capsule. Thereby, the flange-like rim portion 2 is preferably orientated perpendicular to the central axis c of the capsule 1.

The capsule 1 is preferably an integral part made of metal such as aluminium. Thereby, the shown embodiment of the capsule 1 in FIG. 2 is preferably obtained by a deep drawing operation.

The capsule 1 has an outer surface 7a and an inner surface 7b.

At the intersection of the side wall 3a of the body portion 3 and the flange-like rim portion 2 sealing means are applied which are preferably of a linear or meniscus-like form when seen in cross sectional view.

The indicated height h of the capsule is preferably between 10 and 30 mm. The indicated diameter d1 of the side of the body 3 of the capsule 1 to which the flange-like rim portion 2 is connected, is preferably between 20 and 50 mm. Moreover, the indicated diameter d2 of a second side of the body portion 3 of the capsule 1 which comprises the recess 3c is preferably between 20 and 30 mm.

Figure 3:
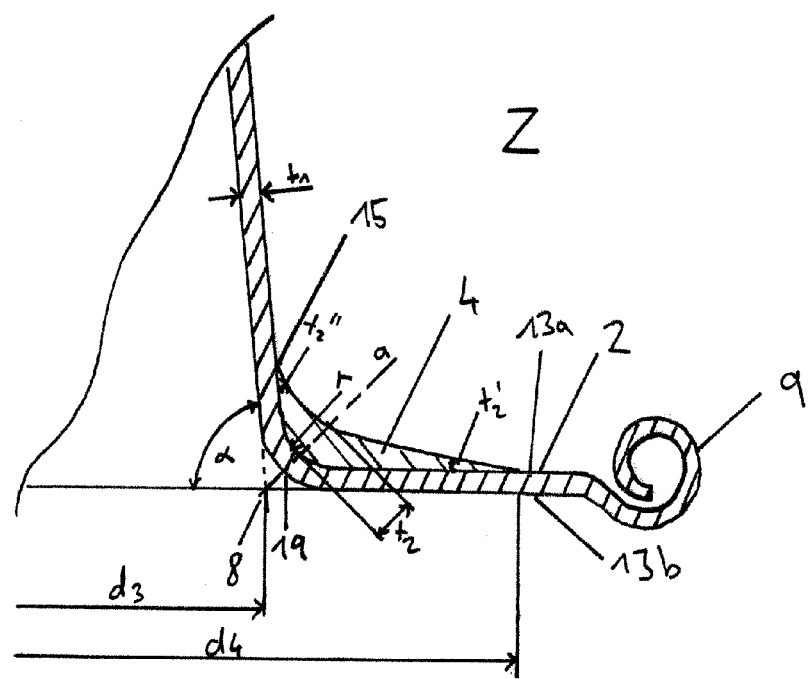
FIG. 3 shows an enlarged view of area Z indicated in FIG. 2.

FIG. 3 is an enlarged view of area Z indicated in FIG. 2 which relates to a sectional side view of the transition 8 between the body portion 3 and the rim portion 2 of the capsule.

The rim portion 2 comprises an upper surface 13a being arranged adjacent to the surface 7a of the side wall 3a and a lower surface 13b being adjacent to the inner surface 7b of the side wall 3a of the capsule body portion 3.

As can be seen in FIG. 3, the rim portion 2 and the side wall 3a preferably intersect by means of a transition 19 which is preferably curved such that no sharp edge is formed between the rim portion 2 and the body portion 3. Thereby, the intersection 19 preferably comprises a radius of curvature between r=0.2 cm to r=0.8 cm.

Furthermore, as indicated in FIG. 3, the rim portion 2 is oriented at a certain angle α to the side wall 3a of the body portion 3 which is preferably equal to or slightly higher or smaller than 90°.

At the end portion 9 of the flange-like rim portion 2 a curled end is preferably formed and hence, no sharp edges are protruding from the capsule at the flange portion 2. Accordingly, a user is prevented from cutting himself when handling the capsule 1.

The thickness t1 of the side wall 3a is preferably equal to the thickness of the rim portion 2. Thereby, the thickness t1 is preferably between 0.1 and 0.5 mm.

The sealing means 4 provided at the transition 19 between the rim portion 2 and the side wall 3a of the body portion are preferably of L-shaped form when seen in cross-sectional side view.

Reference number 'a' denotes an axis which is arranged at a 45° angle to the rim portion 2 and which intersects the indicated intersection point 8 of the rim portion 2 and the side wall 3a of the capsule 1. Thereby, the sealing means 4 have their maximum thickness t2 which is preferably between 0.3 and 0.7 mm, and more preferably between 0.4 mm and 0.6 mm in the direction of the indicated axis a. Accordingly, a maximum thickness t2 of the sealing means 4 is provided at the transition 19 between the rim portion 2 and the side wall 3a of the body portion 3. Hence, enclosing means of a dedicated beverage production device may effectively interact with the capsule 1 in order to enable effective sealing of the capsule 1 during a beverage production process.

Furthermore, the thickness t2 of the sealing means 4 continuously decreases towards the end 9 of the rim portion 2 and towards the indicated end 15 of the sealing means 4 at the side wall 3a of the body portion 3 as indicated by reference numerals t2' and t2" in FIG. 3. According to this embodiment, a concave L-shaped form of the sealing means 4 is obtained.

The sealing means 4 are preferably applied between the side wall 3a of the capsule 1 and the end 9 of the rim portion 2, i.e. the sealing means 4 comprise an outer diameter d4 which is preferably between 30 and 40 mm. The inner diameter of the capsule 1 is indicated by reference number d3 and is preferably between 25 and 35 mm.

With reference to FIGS. 4a to 4c, the application process of the sealing composition 4 to the rim portion 2 of the capsule 1 will be described in the following.

As can be seen in FIG. 4a, an uncured and thus, a liquid or viscous sealing composition 4 is dispensed onto the upper surface 13a of the flange-like rim portion 2. Thereby, the liquid or viscous sealing composition 4 is dispensed by means of a dispensing needle or nozzle member 11 which is connected to a sealing composition supply 12. Moreover, a pump 13 is provided between the supply 12 and the nozzle member 11 and thus, a predefined pressure can be provided to the nozzle member 11 in order to enable a dispensing of the liquid sealing composition 4. In addition, a control unit 14 may be provided which is at least connected to the pump 13 and thus, enables the adjustment of the applied pressure.

The sealing composition 4 is preferably selected from elastomers, silicones, plastics, latex, balata or others. More preferably, as sealing composition a heat-curing silicon adhesive is used which has the advantages of bonding to many substrates without a primer and which occurs rapidly at elevated temperatures. A preferred silicone-rubber sealing composition. In particular, a one-component curing silicone system is preferred such as 'Addisil 1540 D'. Such system is sensitive to temperature and must be kept at chilled temperature (5-8° C.) before depositing. It should also be applied at a controlled atmosphere at ambient temperature in order to control its viscosity during deposition so that the dosing is accurate and blocking problems of the dosing means are avoided.

The supply means 12 may be a tamper seal barrel. The material is preferably kept in chilled conditions before deposition onto the capsule 1 to ensure that no curing has started which would affect the viscosity of the material and so the dispensing and forming capabilities on the capsule 1. Before the dispensing process, the lid of the barrel may be removed and replaced by a piston. Therefore, the barrel may serve as a cylinder for delivery of the liquid rubber. By means of the described control means 14 and the piston pump 13, the dispensing time and the dispensing pressure may be adjusted for the dispensing process.

Preferably, the control unit 14 adjusts the applied pressure of the pump 13 such that pulsing occurs at the beginning of the dispensing process. Accordingly the so-called 'snake-head effect' can be prevented and thus, no (or at least a reduced amount of) sealing composition accumulates at the tip portion 11a of the needle or nozzle element 11.

The liquid sealing composition 4 is preferably dispensed at a predefined distance d to the transition 19 of the side wall 3a and the rim portion 2. Thereby, the sealing composition 4 is preferably dispensed onto a central portion 5 of the rim portion 2 as indicated in FIG. 4a. Accordingly, enough space for the nozzle or needle member to approach the rim portion 2 during the dispensing process is provided.

Preferably, the distance d is chosen to be between 0.5 and 3 mm. It should be noted that the sealing composition 4 should not be dispensed too far away from the side wall 3a of the body portion 3 of the capsule 1, since this would result in an insufficient sealing and thus, leakage may appear during the beverage production process. In particular, the position is also critical because of the very thin seal which is applied onto the capsule 1.

FIG. 4b shows a top view of the capsule 1 after the dispensing of the sealing composition 4 to the rim-portion 2. As can be seen in FIG. 4b, a cord 15 is dispensed in a circumferential way to the body 3 of the capsule 1 onto the upper surface 13a of the flange-like rim portion 2. Thereby, the dispensing process is preferably non continuous, i.e. a gap 16 is formed between the dispensing start point 15a and the end point 15b of the dispensing process. Accordingly, the flowing of the rubber material before curing is anticipated. The distance of the gap may, for instance be of from 0.5 to 3 mm.

The time for the dispensing process of the liquid or viscous rubber sealing material is preferably between 400 and 900 ms. As the amount of deposited sealing material is preferably small, i.e., preferably between 40 and 80 mg, the dispensing means which comprises at least the nozzle member 11, the pump 13, the control means 14 and the supply means 12 are preferably designed such that a precision of +/−3 mg is achieved. Hence, a very accurate dispensing of the sealing component 4 is obtained.

The gap 16 between the dispensing start and end point 15a,15b of the sealing composition cord 15 is preferably between 0.1 and 0.5 mm. It should be noted that more than one gap 16 may be formed at the cord 15 during the dispensing process. For example, the cord 15 may be applied to the rim portion 2 in an intermittent way.

As can be seen in FIG. 4b, the sealing composition cord applied to the rim portion 2 is circumferentially arranged to the body 3 of the capsule 1 and is preferably concentric to central axis c of the capsule 1. Thereby, the cord 15 is of a unitary width t3 which is preferably between 1 and 2 mm.

FIG. 4c relates to a sectional side view of the rim portion 2 (A-A indicated in FIG. 4b) after the application of the sealing composition 4. As can be seen in FIG. 4c, the liquid or viscous sealing composition 4 is situated at a fixed distance d to the transition 19 of the rim portion 2 and the side wall 3a.

FIGS. 5a to 5c relate to a preferred embodiment of the applied sealing composition after the heating and the curing step.

FIG. 5a shows the migration process of the sealing composition 4 during heating. Thereby, reference number 4' relates to the sealing composition shown in FIGS. 4b and 4c which has been applied to the rim portion 2 by means of a dispensing process. Now, during heating of the capsule 1, migration of the sealing composition 4 towards the side wall 3a of the body 3 is enforced as indicated by arrow M. Heating of the liquid or viscous sealing composition 4 is preferably carried out at a temperature between 60 and 80° C., more preferably, the heating temperature is set to 70 (+/−2)° C.

Heating of the sealing component 4 is carried out for 1 to 4 minutes, preferably for 3 minutes.

It should be understood that the flow or migration of the sealing component 4' is due to attractive forces such as electrostatic forces or the surface tension to the side of the body of the capsule. The forces may be influenced by the used material of the capsule. In addition, due to the fact that the capsule body 3 and the rim portion 2 is preferably formed by a deep drawing operation, the capsule 1 may be covered with a lacquer and residue of lubricant which are necessary for the deep drawing operation and which may influence the attraction of the liquid or viscous sealing composition 4'. Certain lubricants may be preferred for their affinity with the material of the sealing member such as silicone based lubricants. Other lubricants should be avoided because they might negatively affect cross-linking. For example, ester-base lubricants are not desired.

During migration of the sealing component 4', the provided gap 16 disappears, i.e. the dispensing start point 15a and the end point 15b are joined together, resulting in a continuous sealing portion 4 of accurate and unitary width t4 as shown in FIG. 5b. As the sealing component 4 flow towards the side wall 3a of the body portion 3 of the capsule, there are no gaps present between the side wall 3 and the sealing component 4. The width t4 is preferably between 0.5 and 2 mm.

After the heating process, curing of the sealing component 4 is carried out. The curing is preferably carried out at a temperature between 110 and 160° C., more preferably between 115 to 125° C. Thereby, the sealing component 4 is cured for a predefined time of 4 to 10 minutes. More Preferably, curing is carried out for a time of 6 minutes.

Due to the curing of the sealing composition 4, a cross-linking of the material is obtained after it has flown to the side wall 3a of the body 3.

FIG. 5c relates to a sectional side view (B-B in FIG. 5b) of a preferred embodiment of the sealing composition 4 after the curing process. Due to the curing, the sealing composition 4 may be slightly retracted. However, the general concave L-shaped or meniscus-shaped form of the sealing composition 4 is not affected by the curing process according to the invention.

FIG. 6 shows a state in which a capsule 1 according to the present invention has been placed into a beverage production device. Thereby, the capsule 1 is provided with sealing means 4 according to the invention. Moreover, the interior of capsule 1 has been filled with portioned ingredients 21 and the capsule 1 has been sealed by means of a foil member 25. Thereby, the foil member 25 is sealed to the flange-like rim portion 2 to close-off hermetically the body portion 3 of the capsule 1.

The ingredients 21 within the capsule 1 are selected such that a beverage can be produced when having a liquid entering the capsule in the region of the recess 3c of the capsule 1 and then interact which such ingredients 3. Preferred ingredients are e.g. ground coffee, tea or any other ingredients from which a beverage or other liquid or viscous comestible (e.g. soup) can be produced.

Note that the foil member 25 as shown is not exactly flat due to a defined over pressure inside the capsule, which over pressure is generated by natural degassing of the ground coffee in the capsule and eventually further introducing e.g. a protective gas when producing the filled capsule 1.

A capsule holder 20 of the beverage production device is preferably equipped with relief elements 22 which are designed to tear and perforate the foil member 25 of the capsule 1. This tearing of the foil member can e.g. occur as soon as the pressure inside the capsule exceeds a threshold value. Note that the relief elements 22 can have any protruding shape able to cause a (partial) tearing of the foil member. As an example only pyramids, needles, bumps, cylinders, elongated ribs are cited.

As shown in FIG. 6, the capsule 1 is placed on a capsule holder 20 of the beverage production device, the foil member 25 resting on the relief element 22 side of the capsule holder 20 and the base body 3 of the capsule 1 being already partly surrounded by the circumferential wall 24 of an enclosing member 23 of the beverage production device. The shown enclosing member 23 has the shape of a bell. However, other shapes are viable, wherein the design of the interior contours (recess) of the enclosing member 23 is generally adapted to substantially match the contours of the capsule 1.

The enclosing member 23 may comprise an external thread 26 for mounting the enclosing member in a beverage production device and a water inlet opening 27 for feeding a liquid such as for example hot water under pressure to a water injector 28 which is releasable mounted (screwed) to the enclosing member 23.

It should be noted that the shown thread 26 is just an example for connection means and therefore, any other releasable or permanent connection means may be used to connect the enclosing member 23 to a beverage production device.

The other components of the beverage production device, such as e.g. the mechanism for displacing the enclosing member 23 and eventually also the capsule holder 20 are known from the prior art in the field of capsule-based espresso machines.

The water injector 28 may be equipped with a needle or nozzle element (not shown) to pierce water inlets in the body of the capsule 1.

Moreover, the water injector 28 preferably comprises opening means 29 for opening a face of the capsule 1. Such opening means 29 may for example be a perforation element such as a blade, pin, etc. designed to produce an opening in the recess 3c or the top wall 3b of the capsule 1 when the capsule holder 20 and the enclosing member 23 are moved close together e.g. by a manually operated or a automatic mechanism. According to this, a liquid such as water can be fed to the interior of the capsule 1 once the perforation element 29 protrudes into the interior of the capsule 1.

Preferably, the enclosing member 23 is equipped with release means 30 for releasing the capsule 1 after the injection of liquid thereto. Said release means 30 prevent a 'vacuum effect' when the capsule 1 is to be released after it has been enclosed by the enclosing member 23 and the capsule holder 20. Accordingly, when the capsule holder 20 is opened, the risk that the capsule 1, instead of falling down, remains sucked into the enclosing member 23 due to a 'vacuum effect' can be avoided. Preferably, said release means 30 are apertures or recessed provided at the circumference of the lower edge 23a of the enclosing member 23 such that air can get into the space between the top wall 3b and the side walls 3a of the capsule 1 and the inner wall 23b of the enclosing member 23, respectively.

FIG. 7 relates to the interaction of the sealing means 4 applied to the intersection between the rim portion 2 and the body portion 3a of the capsule 1 and the enclosing member 23 of a beverage production device.

As can be seen in FIG. 7, the cured sealing composition which has been provided to the capsule 1 is compressible. Accordingly, when the enclosing member 23 and the capsule holder 20 (see FIG. 6) are brought into a position to enclose the capsule 1, a lower edge 23a of the enclosing member 23 is pressed against the sealing means 4 and thus, against the rim portion 2. Thereby, the transition portion 23c of the lower edge 23a and the inner wall 23b of the enclosing member 23 is preferably round-shaped as indicated in FIG. 7. However, the transition portion 23c may as well be chamfered.

The lower edge 23a is preferably equipped with radial grooves or recesses 30 as already described in order to prevent a 'vacuum effect' when the capsule 1 is to be released from the enclosing means 23 and the capsule holder 20.

Furthermore, the enclosing member 23 comprises an annular skirt 31 and a circular recess 23d for promoting the evacuation of water through the nip when no capsule is inserted in the device as described in co-pending patent application No. 08153050.3 entitled: 'Beverage production device for producing a beverage from a single-use capsule'.

If water is injected to the capsule 1 by means of the injector 28 (see FIG. 6), pressurized liquid may be present between an inner wall 23b of the enclosing member 23 and the side wall 3a of the capsule 1 as indicated by arrow P (see FIG. 7). Due to the interaction of the lower edge 23a with the sealing means 4 provided to the capsule 1, said pressurized liquid is however prevented from by-passing the capsule 1. Accordingly, effective sealing of the capsule 1 during the beverage production process is obtained.

It should be noted that the radial grooves or recesses 30 provided at the lower edge 23a of the enclosing member 23 are designed such that they are fully covered and/or filled by the sealing means 4 in a closed position of the enclosing means 23 with respect to the capsule holder 20. Thereby, due to the concave L-shaped form of the sealing means 4, said radial grooves or recesses 30 can be effectively covered, including at the interior side of the enclosing means 23, and thus, effective sealing is obtained. Accordingly, no liquid may by-pass the capsule through said grooves or recesses 30.

During the shown closing pressure engagement of the enclosing member 23, the cup holder 20 and the capsule 1, water entering the interior of the capsule 1 by means of a opened wall or face 3c,3b of the capsule 1 builds up pressure inside the capsule. Moreover, due to the pressure rise in the interior of the capsule, the relief members 22 produce openings in the foil member 25 of the capsule 1. Accordingly, when a sufficient pressure of water has been built up inside the capsule 1, the beverage produced due to an interaction between the injected water and the portioned ingredients housed within the capsule can be drained in small interstices between the relief members 22 and the surrounding foil member 25. Thereby, due to the sealing means 4 liquid provided to the capsule 1 can only flow through the capsule, but not at the exterior of the capsule.

Although the present invention has been described with reference to preferred embodiments thereof, many modifications and alternations may be made by a person having ordinary skill in the art without departing from the scope of this invention which is defined by the appended claims.

For example, the invention is explained referring to a certain design of a capsule, i.e. a design according to which the capsule comprises a cylindrical or frusto-conical base body and a closing foil member. However, it is to be understood than other designs of the capsule are viable, such as e.g. capsules having a lenticular form with two essentially matching and opposing walls (e.g. foils) being sealed at the e.g. ring-shaped edge. Generally a capsule according to the present invention comprises at least two opposing wall members which are connected to each other at the edges to form a sealed flange-like rim area, thus enclosing a sealed interior.

In order to further improve the production process of the applied sealing composition, after curing of the sealing composition, a quality control process may be carried out to check if the seal has been applied correctly and if the geometry is correct. The control is preferably done by means such as by a vision system or by X-ray. Such a vision system may be equipped with a dedicated camera, e.g. a Cognex camera which produces many flashes of blue/red lights, wherein the reflected lights are analysed and treated by a dedicated suitable software. Furthermore, means for providing X-rays to the sealing may be used for detecting any defects of the sealing.

The invention claimed is:

1. A method for producing a sealing member on a capsule intended for producing a beverage in a beverage production device, the capsule comprising a body portion having a side wall and a flange-like rim portion, the rim portion extends from the side wall of the body portion, the method comprising the steps of:
    applying by depositing with a needle or nozzle a dosed amount of an uncured sealing composition made of liquid silicone rubber on the rim portion of the capsule;
    heating the sealing composition under controlled temperature and time conditions that cause the sealing composition to partially migrate towards the side wall until it reaches the side wall to form a continuous closed loop portion present on both the rim and a portion of the side wall body of the capsule; and
    curing the continuous closed loop portion of the sealing composition after the migration towards the side wall.

2. The method for providing a sealing member on a capsule according to claim 1, wherein the step of applying the sealing composition is performed in a non-continuous fashion.

3. The method for providing a sealing member on a capsule according to claim 1, wherein the sealing composition is applied onto the rim portion at a distance from the intersection of the side wall to the rim portion of the capsule.

4. The method for providing a sealing member on a capsule according to claim 1, wherein the sealing composition is applied on the rim portion at a central portion of the rim.

5. The method for providing a sealing member on a capsule according to claim 1, wherein the continuous closed loop portion is distributed about a circumferential transition between the rim and the side wall.

6. The method for providing a sealing member on a capsule according to claim 5, wherein the continuous closed loop portion has a concave L-shaped cross-section.

7. The method for providing a sealing member on a capsule according to claim 1, wherein heating of the sealing composition is performed at a temperature of 70-80° C.

8. The method for providing a sealing member on a capsule according to claim 1, wherein curing of the sealing composition is performed at a temperature of 120-160° C.

9. The method for providing a sealing member on a capsule according to claim 1, wherein the sealing composition is applied on the capsule in a total amount of 10-150 mg.

10. A capsule comprising a sealing member produced by the method of claim 1.

11. The method according to claim 1, wherein a material in the body portion of the capsule or applied to the body portion of the capsule promotes, by attractive forces, the migration of the sealing composition toward the side wall relative to a capsule without the material.

12. The method according to claim 5, wherein the continuous closed loop portion is equally distributed about the circumferential transition between the rim and the side wall.

* * * * *